United States Patent [19]

Le Mehaute

[11] 4,439,058
[45] Mar. 27, 1984

[54] ASYMMETRIC SEAWEEDS

[75] Inventor: Bernard J. Le Mehaute, Miami, Fla.

[73] Assignee: University of Miami, Coral Gables, Fla.

[21] Appl. No.: 346,894

[22] Filed: Feb. 8, 1982

[51] Int. Cl.³ .............................................. E02B 3/04
[52] U.S. Cl. ..................................... 405/24; 405/28; 405/35
[58] Field of Search .................. 405/21, 24, 25, 27, 405/28, 34, 35

[56] References Cited

U.S. PATENT DOCUMENTS

| | | | |
|---|---|---|---|
| 260,016 | 6/1882 | Franklin | 405/28 X |
| 1,516,767 | 11/1924 | Falley | |
| 2,994,201 | 8/1961 | Hutchings | 405/27 |
| 3,267,679 | 10/1963 | Morse | 61/3 |
| 3,276,210 | 10/1966 | Stitt | 61/5 |
| 3,299,640 | 1/1967 | Nielsen | 61/3 |
| 3,323,310 | 6/1967 | Arpin | 61/3 |
| 3,386,250 | 6/1968 | Katayama | 61/3 |
| 3,559,407 | 2/1971 | Schuur | 61/3 |
| 3,590,585 | 7/1971 | DeWinter | 61/3 |
| 3,628,334 | 12/1971 | Coleman | 61/5 |
| 3,673,805 | 7/1972 | Szyfter | 61/5 |
| 3,691,774 | 9/1972 | Hard | 61/5 |
| 3,846,990 | 11/1974 | Bowley | 61/5 |
| 3,848,419 | 11/1974 | Bowley | 61/5 |
| 3,892,075 | 7/1975 | Tibbett | 61/4 |
| 3,894,397 | 12/1975 | Fair | 61/4 |
| 3,928,978 | 12/1975 | Larsen | 61/3 |
| 4,130,994 | 12/1978 | Van Moss, Jr. | 405/24 |
| 4,221,500 | 9/1980 | Garrett | 405/24 |
| 4,374,629 | 2/1983 | Garrett | 405/24 |

Primary Examiner—David H. Corbin
Attorney, Agent, or Firm—Irons and Sears

[57] ABSTRACT

An artificial seaweed, or "asymmetric seaweed", system for preventing shoreline erosion and/or causing sand accretion on beaches under wave action.

15 Claims, 9 Drawing Figures

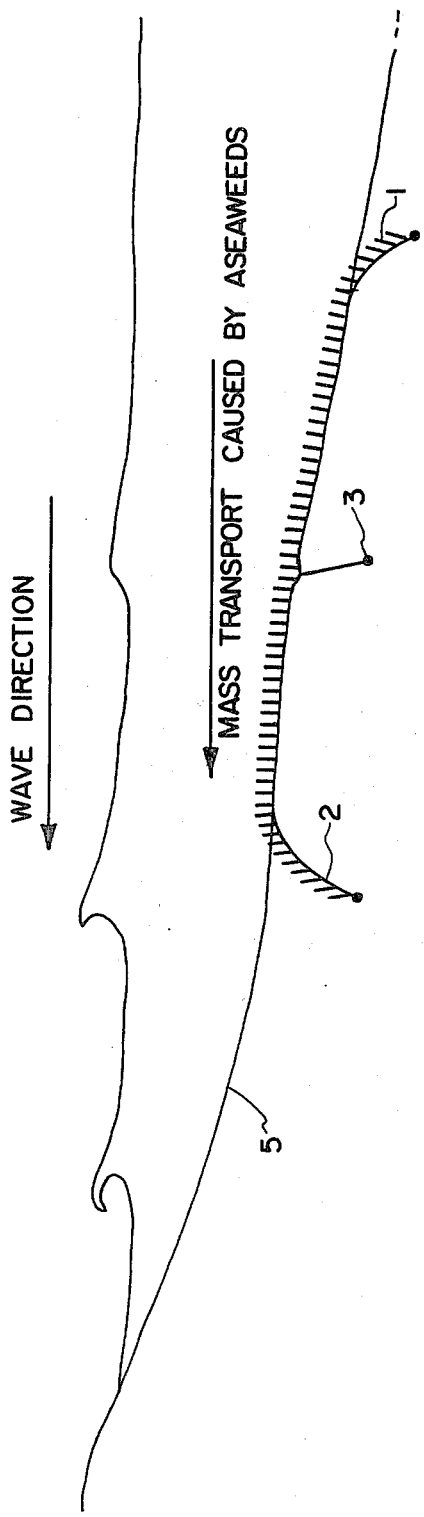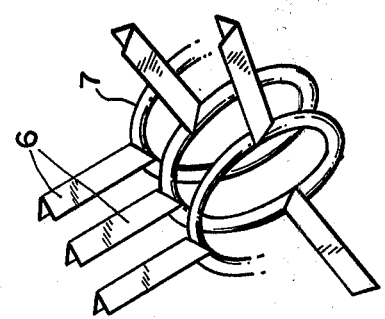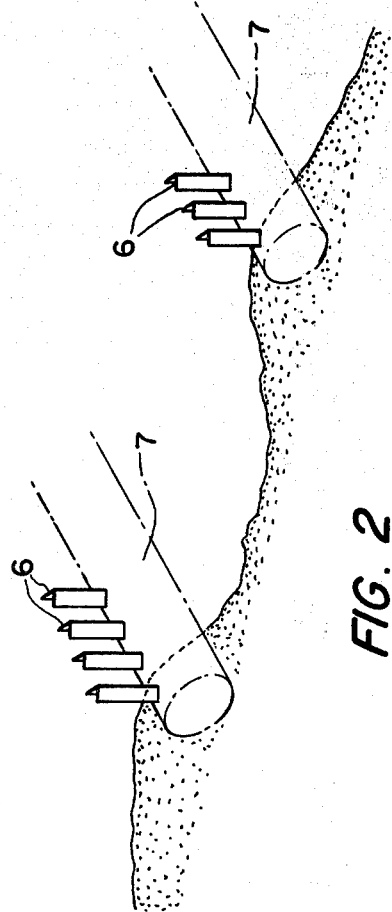

EFFECT OF WAVE ASYMMETRY ON SEDIMENT

ASYMMETRIC SEAWEEDS

BACKGROUND OF THE INVENTION

This invention relates to a system for preventing shoreline erosion and/or causing sand accretion on the beach.

In many shore areas of the world the shoreline is rapidly receding because of the rise of sea level and the movement of the currents and waves especially as the result of storms. This movement of currents and waves gives rise to a corresponding movement of particles, such as sand particles, in the shore region. This movement of particles proceeds by three main processes.

The first process is known as "bed load transportation" and results in transportation of a large amount of sand deposits by the rolling or slipping of said particles in the boundary layer near the bottom.

A second process is known as "transportation by suspension". In this process, the lightest particles are moved from the bottom by turbulence of the water and become suspended in the fluid. The particles are carried a long distance from their origins before being deposited.

The third process, which also produces a localized transportation of the particles, is known as "saltation". In saltation, particles jump up from the bottom and fall back again close to its original location.

Shoreward movement of particles, or sediment accretion, is predominantly by "bed load transportation" whereas a seaward motion, erosion, is caused predominantly by suspension. Extensive turbulence, which results in a suspension of the particles, occurs in a breaking wave and in the surf zone.

Various means have been designed to combat erosion of beaches, shorelines, with varying degrees of success. These means have taken two main forms, wave barriers (relatively solid structures) and artificial seaweed.

In U.S. Pat. No. 1,516,767, a baffle, having various shapes, was implanted on or near the ocean floor and its purpose was to deflect the minor ocean currents and break up the major currents. U.S. Pat. No. 3,276,210, provides a series of circular or triangular shaped barriers, suspended mainly at the surface or near the surface of the wave, with the main purpose of breaking up an incoming wave. The main purpose of this barrier is to break up the waves and protect moorings.

Other forms of barriers which are utilized to break up waves are shown in U.S. Pat. Nos. 3,628,334; 3,673,805; 3,691,774; and 3,848,419.

Katayma, U.S. Pat. No. 3,386,250, utilizes a series of concrete blocks in the shape of isosceles triangles to apparently control the direction of the current flow and reduce the eddy currents and turbulence which should result in reduced erosion. Fair, U.S. Pat. No. 3,894,397, adds a flapper-type valve to concrete blocks which closes against seaward wave motion. This structure thus favors a shoreward wave motion over a seaward wave motion that would favor an accretion of the shoreline.

Tibbett, U.S. Pat. No. 3,892,075, is a "vortex generating system" which causes a depositing of suspended particles.

Larsen, U.S. Pat. No. 3,928,978, suspends a mat over a portion of the sea floor at a specific distance from the sea floor. Sediment flow is impeded by this device resulting in an accumulation under the mat. When the sediment level reaches that of the mat, the mat is raised and the process repeated.

Still other forms of wave barriers may be found in U.S. Pat. Nos. 3,846,990; 3,267,679; and 4,130,994.

Many of the described wave barriers are massive structures which cannot be easily moved. They also tend to be rigid. They are designed primarily to break up the wave energy and eventually succeeds to prevent some erosion.

The second main means for controlling erosion is by the utilization of devices generally known as artificial seaweeds.

Various forms of artificial seaweeds were developed to avoid the disadvantages exhibited by the barrier type structures, and are illustrated by U.S. Pat. Nos. 3,299,640; 3,323,310; 3,590,585; 3,559,407 and 4,221,500.

DeWinter, U.S. Pat. No. 3,590,585, interweaves strands of a thermoplastic material, to prevent the knotting and entangling of individual strands, into a net form. The net is anchored by a tube filled with cement or sand. The density of the net fibers are such that the net will float in the water.

Nielsen, U.S. Pat. No. 3,299,640, is directed to a wide screen formed by a large series of filamentary plastic elements, strands, which are secured at one end to an anchoring means. Each row of the filamentary strands may be attached to a single anchoring means and several rows placed on the sea floor or several rows of filamentary strands may be attached to the same anchoring means.

Arpin, U.S. Pat. No. 3,323,310, is directed to a simulated reef which is composed of an elongated structure, which may be concrete, in which is imbedded a large number of discrete extending rods, tubes or wands of flexible material.

Garrett, U.S. Pat. No. 4,221,500, is directed to a flexible, non-woven sheet material which is attached to an anchor and which has series of parallel cuts extending from its upper edge down to approximately the anchoring means. An uncut sheet of material separates the cut area from the anchoring means.

These long, flexible, usually symmetrical, means, although they alleviate some of the disadvantages of the bulky barrier means are still inefficient in preventing erosion and/or accretion, and are subjected to large wave forces during storms.

BRIEF DESCRIPTION OF THE INVENTION

The present invention comprises an artificial seaweed, or "asymmetric seaweed", system for preventing shoreline erosion and/or causing sand accretion on beaches under wave action which does not possess the disadvantages of the barrier or artificial seaweed systems of the prior art.

In this invention a large number, per unit area or unit length, of relatively short non-symmetric, directional artificial seaweeds are implanted in a permeable mat or lines of tubular bases. Underpressure due to wave action is prevented by the permeable nature of the mat. The mat's permeable nature also reduces the wave force.

The obstacles, asymmetric seaweed, formed by implanting these structures near the sea bottom may take any shape provided that they are asymmetric and that under wave action they favor the mass transport in a given direction towards the beach.

BRIEF DESCRIPTION OF THE DRAWINGS

Although the configuration of the asymmetric seaweed of this invention may take various shapes and be anchored by any means, preferred configurations of asymmetric seaweed and anchoring means are illustrated in the following drawings:

FIG. 1 is a diagrammatic view illustrating a beach profile and single strand asymmetric seaweed in use, according to an embodiment of the present invention.

FIG. 2 is a diagrammatic view illustrating V shaped asymmetric seaweed in use, according to an embodiment of the present invention.

FIG. 3 is an illustration of another embodiment of the present invention showing a coiled spring support means.

DESCRIPTION OF THE INVENTION

Figure 4A:
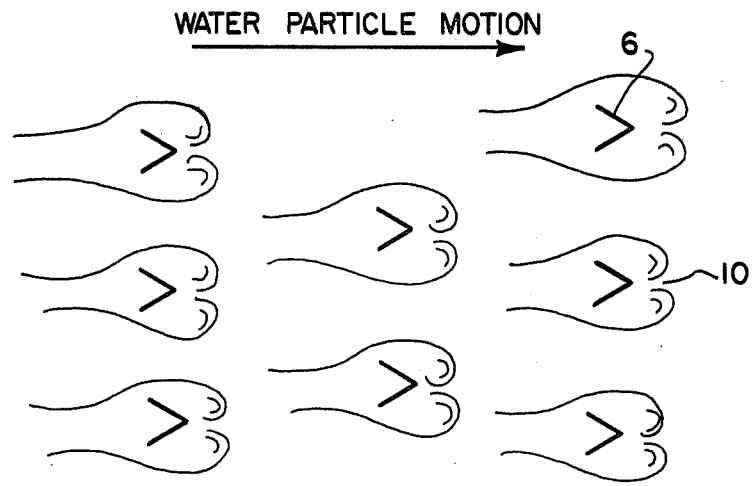
FIG. 4A is a diagrammatic view showing the effect on water particle motion by opened V shaped asymmetric seaweed.

A system designed to prevent the erosion of a shoreline and, under certain conditions, simultaneously produce an accretion of the shoreline, must consider the various climatic conditions which effect the movement of particles. The previously discussed mechanisms for movement of particles, that is, bed load transportation, suspension and saltation, obey statistical laws, with the concentration of solid particles increasing from the free surface to the bottom of the water. The concentration of solid particles varies directly with water velocity, wave agitation and rate of turbulence. As these factors increase so does the concentration of solid particles in the water increase. In a breaking wave and in the surf zone, the rate of turbulence is particularly high, so that a relatively higher concentration of particles is in suspension.

The equilibrium profile of a beach is obtained by a balance between gravitational and hydrodynamic forces due to water waves. Since the equilibrium profile of a beach tends to be a slope, the sediment is constantly subjected to a gravitational force pulling the sediment down the slope and off-shore. At the same time wave action causes a hydrodynamic force which is opposite in direction, on-shore, to the gravitational force. Where the equilibrium is shifted in favor of the gravitational force there is an off-shore movement resulting in erosion. Conversely, where the hydrodynamic force is favored there is a shoreward push of the sediment by the wave action.

The threshold bottom velocity is triggered by the back and forth movement, due to the wave in the near bottom boundary layer and can be analyzed. From linear wave theory, the bottom velocity $U_b$ is given by the utilization of formula I $$U_b = \frac{\pi H}{T} \frac{1}{\sinh \frac{2\pi d}{L}} \cos\theta \qquad \text{I}$$

wherein $U_b$ is the bottom velocity, H is the wave height, T is the wave period, L the wavelength, d the water depth and $$\theta = 2\pi \left( \frac{x}{L} - \frac{t}{T} \right)$$

wherein x is the horizontal distance and t is the time. From formula I it is seen that bottom velocity increases as the wave height increases and increases with a corresponding decrease in the water depth. The back and forth movement is symmetrical.

In order to explain the net forward or backward motion of particles, other phenomena must be studied.

In water waves near the bottom, the positive forward velocity, under a wave crest, is larger than the negative backward velocity under a wave trough. Subsequently, the threshold velocity may be exceeded under the wave crest and exceeded by a lesser amount or not at all under a wave trough resulting in a net shoreward movement of the sediment near the bottom. This is evident from a consideration of formula II, given by a non linear theory:

$$U_b = \frac{\pi H}{T\sinh \frac{2\pi d}{L}} \cos\theta + \frac{3\pi^2 H^2}{4LT\sinh^4 \left( \frac{2\pi d}{L} \right)} \cos 2\theta \qquad \text{II}$$

wherein the definition of the symbols are the same as in formula I.

Figure 6:
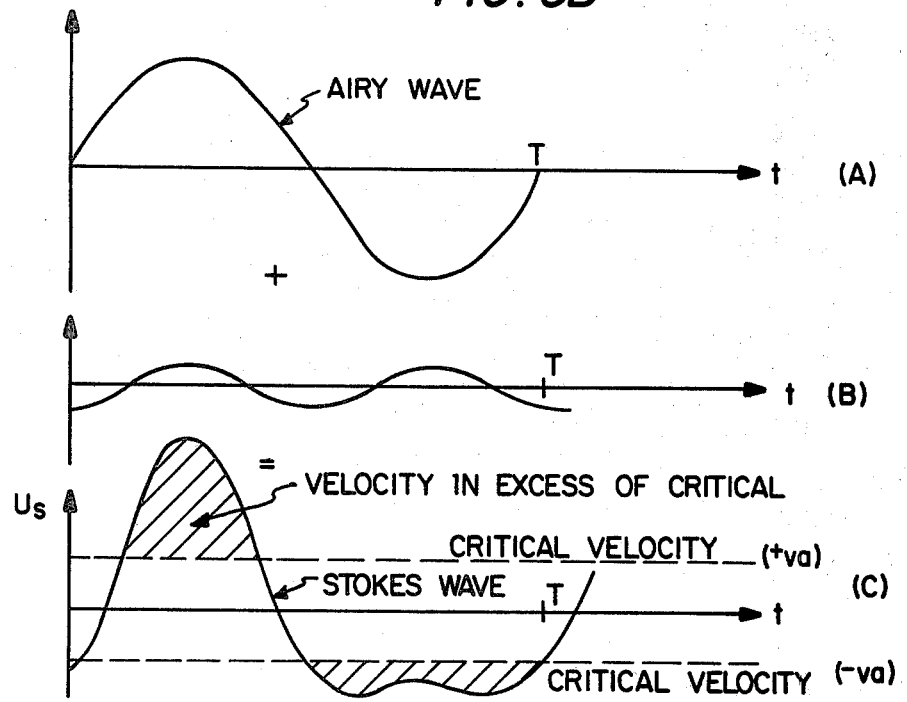
FIG. 6 is a graph showing the effect of wave asymmetry on sediment.

The second term in formula II introduces a component having twice the frequency of the first term, which is in phase under the wave crest and in opposition of phase under a wave trough resulting in an asymmetrical movement as illustrated in FIG. 6. It is seen from FIG. 6 that the asymmetry of the wave (C) increases the amount of particles deposited over that which is possible under either symmetrical wave (A) or (B).

In addition, the shearing force in the boundary layer, under the crest, has a smaller value than the shearing force under the wave trough. The tendency therefore is for the particles to move shoreward rather than seaward.

Since the hydrodynamic forces increase as the depth of water decreases, there must be a corresponding increase in gravitational force, by a steepening of the beach profile, to maintain equilibrium of a beach.

Figure 7:
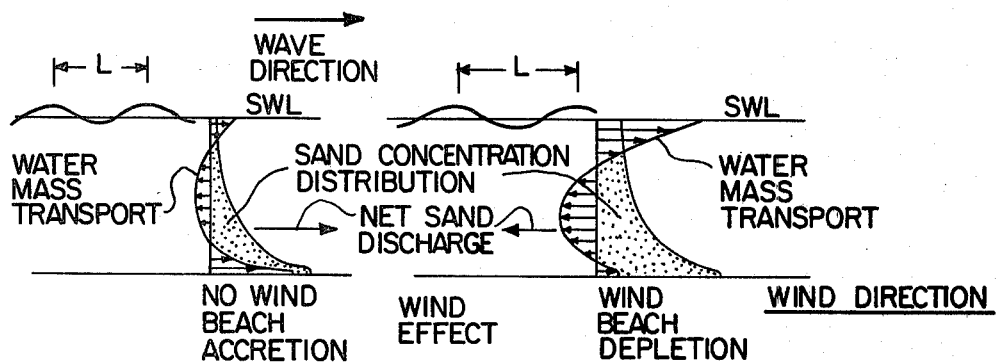
FIG. 7 is a diagrammatic view showing the vertical distribution of mass transport of particles and the effect of wind.

Seaward motion of sediment is caused by a large suspension of sediment in the intermediate zone of the water. This zone moves seaward as opposed to the shoreward movement of the surface and bottom zones of the water. The seaward movement of the large quantity of sediment may exceed the shoreward movement thus resulting in a depletion, erosion, of the shoreline. These effects are enhanced by wind, as illustrated in FIG. 7. Under swell conditions (no wind), the mass transport near the bottom is the dominating factor resulting in accretion. Thus during the summer months when there is little wind there is usually an accretion of the beaches.

During the winter months when there is usually an increase of wind velocity, it causes the waves to be steeper, generating plunging breakers causing increased turbulence and consequently, increased suspension of sediment. The whitecaps which are also formed maintain a high level of turbulence which also favors suspension of sediment. In addition, the wind modifies the mass transport distribution by forcing the waves to become rotational so that the vorticity induced by the wind diffuses downward. This enhances the mass transport, near the free surface in the direction of the wave travel and, for continuity, forms a return flow near the bottom. The shoreward mass transport near the bottom, above the boundary layer, is reduced resulting in a reversal of direction of the mass transport in layers of fluid still heavily loaded with sediment. The net result is erosion of the beach.

In the present invention asymmetric seaweed are shaped and implanted on the sea floor in a manner that channelizes the wave energy instead of reducing it. The wave's energy is channelized to make the wave work and push the sand shoreward which prevents erosion. FIG. 1 is a schematic diagram showing the implantation of asymmetric seaweed 1 along the beach profile 5. In this embodiment of the invention, the asymmetric seaweed 1 are attached to a permeable mat 2 which is anchored at two or more places by any of the conventional anchoring means 3. The asymmetric seaweed is usually implanted near the surf zone, where, as it was shown in formulas I and II, the depth of the water is such as to maximize the effects produced by the asymmetric seaweed. The wave surface 4 and direction is as shown. The total effect is to enhance the shoreward mass transportation of the sand.

The permeable mat 2, which is shown in this embodiment, is utilized to prevent underpressure due to wave action. The mat may be produced from any conventional material which is relatively strong and resistant to sea water. Polymeric material such as polypropylene and polyethylene, which do not absorb water are suitable examples of material for use in preparing the mat 2.

If the mat 2 is prepared from non-polymeric material, such as rope, the asymmetric seaweed must be attached to the mat by braiding or by tying. The use of a synthetic mat permits the asymmetric seaweed 1, when it is also made of a synthetic material, to be fused to the mat or attached by water resistance glues, such as the commercially available cyanoacrylates and the polyethylene glycol dimethacrylate base adhesives.

The anchors 3 may be any conventional anchoring means such as cement blocks and hollow articles filled with cement, sand or mixtures thereof.

The asymmetric seaweed 1 is shown in FIG. 1 as a single filamentary strand, which is one embodiment of this invention. The individual strands should be asymmetrical in height and width. The purpose of the asymmetry is to create an asymmetrical current effect in the wave motion. This same asymmetry is followed in other embodiments of this invention such as the embodiment shown in FIGS. 2, 3 and 4.

The asymmetric seaweed should generally be about 10 cm. to about 30 cm. in length when attached to a tubular base or permeable mat. When the asymmetric seaweed is attached to a floating crib, as in FIG. 5, the asymmetric seaweed is reversed as to create a mass transport seawards near the surface. The sea water near the surface is relatively free of sediment and clear, compared to the near bottom layers. Since the water is pushed seaward near the surface, a shoreward current is created near the bottom where the sediment is located.

The width b of the asymmetric seaweed is restricted to a range of about 3 mm to about 6 mm. Widths much greater than 6 mm have the tendency to cause large turbulent eddies which result in higher suspension concentrations thus reversing the effect of the asymmetric seaweed. The Reynolds number $U_b b/\gamma$ must be smaller than $10^{-3}$; $\gamma$ is the kinematic viscosity.

The recommended length and width of the asymmetric seaweed is in stark contrast to the prior art which recommends a length of 2 ft. to 15 ft. (U.S. Pat. No. 4,221,500).

Individual asymmetric seaweed filament width does not have to be uniform throughout its length. Ease of manufacture however, often dictates that its width be uniform throughout its length.

Figure 4B:
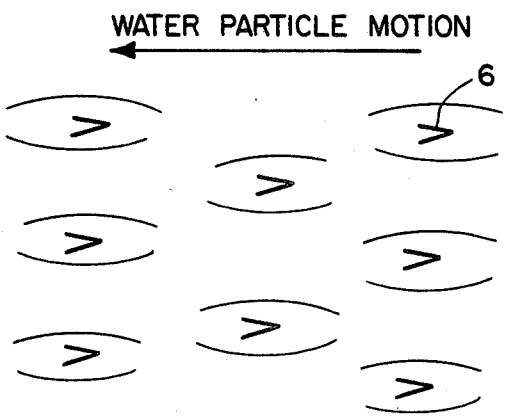
FIG. 4B is a diagrammatic view showing the effect on water particle motion by closed V shaped asymmetric seaweed.

In FIG. 2 the asymmetric seaweed 9 is illustrated as a V-shaped structure and is shown attached to a tubular base 7 as the anchor. In this embodiment the asymmetric seaweed is placed on the sea floor so that the open portion of the V faces in the general direction of the beach. In this position, if the main wave direction is toward the beach, the V is closed as shown in FIG. 4B. When the main wave force (water particle motion) is seaward, the V opens causing a wake 10 and deposition of suspended sediment, FIG. 4A. Other shapes which can open and close, that is, the width increases and decreases, in response to wave and wave force motion, can also be utilized provided it offers little resistance when the main wave force is shoreward and greater resistance when the force is seaward enhancing an assymetry of the wave motion and mass transport. If the asymmetric seaweed is fixed on a floating crib, the open portion of the V shape faces the open sea.

The asymmetric seaweed is shown in FIG. 2 to be attached to a tubular base 7 which forms the anchor and is filled with cement, sand, mixtures thereof, or other heavy material.

Asymmetric seaweed may be rigid or flexible with a flexible configuration being preferred. The asymmetric seaweed may be flexible at the point of opening and closing if it is to assume the configuration shown in FIG. 2, but this feature is not necessary to create the asymmetry of the fluid flow. Vertical flexible configuration is also to be preferred to avoid injury to swimmers or boats, should they accidently come in contact with the asymmetric seaweed.

When the asymmetric seaweed is attached to a tubular base, the attachment can be by any conventional means or by passing the asymmetric seaweed through openings in the tubular base and being retained in the tubular base by the base of the asymmetric seaweed, which should be of a greater diameter than the diameter of the opening.

The tubular base, or anchor, 7, comprises a cylindrical tube, generally of a flexible material, closed at each end and filled with a ballast material. The length and diameter of the cylinder varies according to the nature of the ballast, length of asymmetric seaweed to be implanted and the convenience of handling. Several units may be joined together, before or after implanting.

The length dimension of the asymmetric seaweed embodiment 6 of FIG. 2 is similar to the single strand embodiment 1 of FIG. 1. The width of each arm of the V is dependent upon the dimension of the V's opening; and of such dimensions that the opening dimensions are in the range of about 3 mm. to 10 mm.

Another embodiment of this invention is illustrated by FIG. 3 showing the asymmetric seaweed attached to a spring 7. The spring arrangement permits easy storage and when needed can be easily expanded and anchored as the permeable mat is anchored. Some of the asymmetric seaweed are buried under the sand and form an anchor. Others operate as described hereabove to enhance the mass transport shorewards.

Figure 5A:
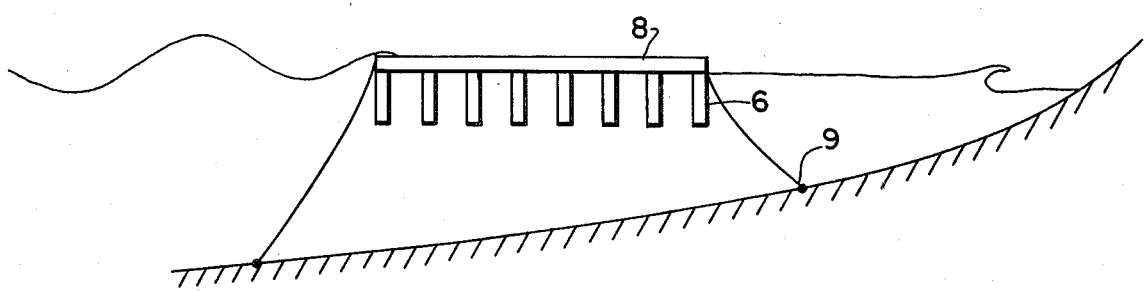
FIG. 5A is a diagrammatic elevational view illustrating a floating crib embodiment of asymmetric seaweed as used in this invention.
Figure 5B:
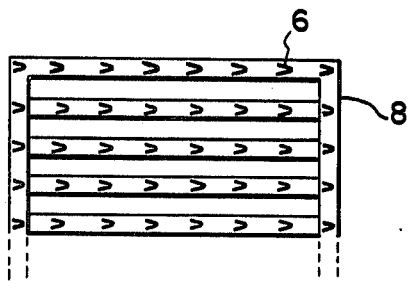
FIG. 5B is a top view of the crib embodiment of FIG. 5A.

A still further embodiment of this invention is illustrated by FIG. 5. In this embodiment, the asymmetric seaweed is attached to a floating crib 8 which is anchored 9 to the sea floor. The asymmetric seaweed 6 can be either the single strand embodiment 1 or the open-close embodiment, as illustrated by the V-shape 6. The length of the asymmetric seaweed is in the range of about 4 cm to about 100 cm.

The crib material 8 may be any buoyant material and is preferably of a polymeric material, such as polypropylene or polyethylene, which may also be of a foamed nature to increase its buoyancy.

Crib dimensions range from 8 ft. to 50 ft. in length and 8 ft. to 50 ft. in width. The overall dimensions are mainly dependent upon ease of installation. The asymmetric seaweed is anchored to the crib as in the embodiment illustrated in FIG. 1.

While presently preferred embodiments of the invention have been illustrated and described, it will be recognized that modifications may be made, and it is intended in the following claims to cover all such modifications which come within the spirit and scope of the invention.

What is claimed is:

1. A device which, once implanted in the water adjacent to a surf zone of a beach, channelizes wave energy to inhibit coastal erosion and enhance accretion comprising:
   (a) an anchoring means;
   (b) a base;
   (c) a plurality of dynamically asymmetric strips, one end of which is attached to said base and the other end of said strip extends away from said base into the boundary layer of the water near the bottom or near the surface;
   (d) a means for attaching said asymmetric strips to said base; and,
   (e) said asymmetric strips having means permitting a decrease in the width of said asymmetric strips when wave motion is directed toward one side of said asymmetric strips, and having means permitting an increase in the width of said asymmetric strips when wave motion is directed toward the other side of said asymmetric strips;
   whereby such decrease and increase in said width of said asymmetric strips being controlled by wave motion to inhibit coastal erosion and enhance accretion.

2. A device in accordance with claim 1 wherein said base is a permeable mat.

3. A device in accordance with claim 1 wherein said base is a tubular structure.

4. A device in accordance with claim 1 wherein said asymmetric strips are flexible.

5. A device in accordance with claim 2 wherein said permeable mat consists of a polymeric material.

6. A device in accordance with claim 4 wherein said asymmetric strips consist of polymeric material.

7. A device in accordance with claim 5 or 6 wherein said polymeric material consists of a polyvinyl material selected from polypropylene or polyethylene.

8. A device in accordance with claim 5 or 6 wherein said asymmetric strip is fused, at one end, to said base.

9. A device in accordance with claim 6 wherein the length of each of said asymmetric strips is in the range of about 10 cm to about 40 cm and the width is in the range of about 3 mm to about 10 mm.

10. A device in accordance with claim 1 in which said asymmetric strip is V shaped.

11. A device in accordance with claim 3 wherein said tubular structure has multiple openings on the surface adjacent to the main body of water.

12. A device in accordance with claim 11 wherein said strips extend out through said openings in said base and being retained in said base, said attached end of said strip being of greater dimension than said openings.

13. A device in accordance with claim 1 or 2 wherein said base is more buoyant than water.

14. A device in accordance with claim 10 wherein the opening of said V shape asymmetric strip faces the beach and said base is on the sea floor.

15. A device in accordance with claim 13 wherein the opening of said V shape asymmetric strip faces seaward.

* * * * *